US012234715B2

(12) United States Patent
Samuel et al.

(10) Patent No.: US 12,234,715 B2
(45) Date of Patent: Feb. 25, 2025

(54) WELL OPERATION EVALUATION SYSTEMS AND METHODS TO ANALYZE A BROOMSTICK CHART OF A WELL OPERATION

(71) Applicant: Landmark Graphics Corporation, Houston, TX (US)

(72) Inventors: Robello Samuel, Cypress, TX (US); Rishi Adari, Katy, TX (US)

(73) Assignee: Landmark Graphics Corporation, Houston, TX (US)

(*) Notice: Subject to any disclaimer, the term of this patent is extended or adjusted under 35 U.S.C. 154(b) by 259 days.

(21) Appl. No.: 17/628,882

(22) PCT Filed: Aug. 23, 2019

(86) PCT No.: PCT/US2019/048000
§ 371 (c)(1),
(2) Date: Jan. 20, 2022

(87) PCT Pub. No.: WO2021/040680
PCT Pub. Date: Mar. 4, 2021

(65) Prior Publication Data
US 2022/0251927 A1    Aug. 11, 2022

(51) Int. Cl.
*E21B 41/00*    (2006.01)
*E21B 47/00*    (2012.01)
(Continued)

(52) U.S. Cl.
CPC .............. *E21B 47/00* (2013.01); *E21B 41/00* (2013.01); *E21B 2200/20* (2020.05);
(Continued)

(58) Field of Classification Search
CPC ...... E21B 47/00; E21B 41/00; E21B 2200/20; E21B 2200/22; G06Q 10/03; G06Q 50/02; G06Q 10/063
(Continued)

(56) References Cited

U.S. PATENT DOCUMENTS 6,490,500 B1    12/2002  McCulloch
2004/0040746 A1*   3/2004  Niedermayr ............ E21B 44/00
                                                                   175/48
(Continued)

FOREIGN PATENT DOCUMENTS

WO    2016182799 A1    11/2016
WO    2017160993 A1     9/2017
WO    2018029454 A1     2/2018

OTHER PUBLICATIONS

International Search Report and Written Opinion date mailed May 21, 2020; International PCT Application No. PCT/US2019/048000.

*Primary Examiner* — Michael P Nghiem
(74) *Attorney, Agent, or Firm* — DeLizio, Peacock, Lewin & Guerra, LLP (57) ABSTRACT

The disclosed embodiments include well operation evaluation systems and methods to analyze a broomstick chart of a well operation. The method includes receiving data indicative of a broomstick chart of a well operation. The method also includes diagnosing an issue during the well operation based on the broomstick chart. The method further includes predicting an impact on the well operation as a result of the issue. The method further includes determining a likelihood of occurrence of the impact. The method further includes determining a solution to overcome the issue.

17 Claims, 4 Drawing Sheets

(51) Int. Cl.
*G06Q 10/063* (2023.01)
*G06Q 50/02* (2024.01)

(52) U.S. Cl.
CPC ........ *E21B 2200/22* (2020.05); *G06Q 10/063* (2013.01); *G06Q 50/02* (2013.01)

(58) Field of Classification Search
USPC .......................................................... 702/6
See application file for complete search history.

(56) References Cited

U.S. PATENT DOCUMENTS

| | | |
|---|---|---|
| 2008/0065362 A1 | 3/2008 | Lee et al. |
| 2015/0134257 A1* | 5/2015 | Erge ...................... E21B 49/003 |
| | | 702/9 |
| 2017/0321531 A1* | 11/2017 | Far .......................... E21B 43/26 |
| 2018/0171774 A1 | 6/2018 | Ringer et al. |
| 2022/0251911 A1* | 8/2022 | Samuel ................. E21B 23/001 |

\* cited by examiner

WELL OPERATION EVALUATION SYSTEMS AND METHODS TO ANALYZE A BROOMSTICK CHART OF A WELL OPERATION

BACKGROUND

The present disclosure relates generally to well operation evaluation systems and methods to analyze a broomstick chart of a well operation of a formation.

Drag charts, torque charts, torque point charts, bending stress charts, as well as other charts that have broomstick shaped plots of well operations are sometimes generated and analyzed during planning and drilling stages of a hydrocarbon well to determine how the hydrocarbon well should be completed. However, analysis of broomstick shaped charts of well operations are often performed manually, which are time consuming, add a delay, and sometimes fail to consider available data. Further, it is sometimes challenging to calibrate values shown on the plots due to a frictional force experienced by conveyances and tools used in the well operations, thereby increasing the likelihood of inaccurately analyzing broomstick shaped charts of well operations.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to well operation evaluation systems and methods to analyze a broomstick chart of a well operation. The system receives data indicative of a broomstick chart of a well operation. As referred to herein, a broomstick chart refers to drag charts, torque charts, torque point charts, bending stress charts, as well as other charts that have broom stick shaped plots of well operations. As referred to herein, a well operation includes, but is not limited to, a rotating-off-bottom operation, a rotating-on-bottom operation, a tripping-in operation, a tripping-out operation, a sliding operation, a backreaming operation, a fishing operation, as well as other types of well operations performed before or during drilling. The broomstick chart is analyzed to diagnose an issue associated with the well operation. As referred to herein, an issue associated with a well operation includes any issue that may occur as a result of performing the well operation at a current set parameters. Examples of issues include, but are not limited to, a stuck pipe during the well operation, a near-stuck pipe during the well operation, a pack-off having a threshold greater than a pack-off threshold, a loss of circulation that is greater than a circulation threshold, a conveyance (defined herein) deployed during the well operation having a torque that is greater than a threshold torque, a conveyance used during the well operation having a drag response that is greater than a threshold drag response, a cutting bed having a height that is greater than a height threshold, as well as other issues that impact drilling, completion of the well, or hydrocarbon production from the well. Further, in some embodiments, issues also include potential issues that may occur as a result of performing the well operation at the current set of parameters. For example, if performance of the well operation at the current parameters for another 50 feet, 100 feet, 200 feet, or another distance would result in a stuck pipe, then there is an issue associated with the well operation.

In some embodiments, the system determines expected values and actual values of one or more parameters of the well operation and diagnoses the issue based on the differences between the expected values and actual values of the one or more parameters. Examples of the one or more parameters include, but are not limited to, a frictional force experienced by conveyances and tools used in the well operation, torque and drag experienced by the conveyances and tools used in the well operation, the diameter of the wellbore, the type of lubricity used for the well operation, presence of the cuttings bed in the wellbore, presence of the pack-off, the dogleg in the wellbore, the keyseat in the wellbore, the degree of curvature of the wellbore, wellbore torsion, well profile energy, cuttings accumulated in the undulations, the wellbore tortuosity of the wellbore, the viscous effect of the wellbore, the diameter of the wellbore, the asperity between the conveyance used in the well operation and the wellbore, as well as other parameters related to the well operation. For example, the system, in response to determining expected value of frictional force is −0.2 and the actual value of the frictional force is −0.4, or differs from the expected value by a threshold amount or ratio, also determines that there is an issue with the well operation.

In some embodiments, the boundary conditions at the bottom of the conveyance such as weight on bit (e.g., positive or negative), bit rotation, pipe velocity or movement (e.g., upward or downward movement) dictate the condition of the operation state or the rig state. In one or more embodiments, frictional forces are determined based on the movement and rotation. In one or more embodiments, frictional forces experienced by the conveyance result in different well operations on the surface and downhole. In one or more of such embodiments, while a tripping-out operation of a conveyance is performed on the surface, frictional forces experienced by the conveyance downhole prevent the conveyance from moving, or cause the conveyance to perform an off-bottom operation. In such embodiments, the actual frictional force at a downhole location where the off-bottom operation is performed is different from the expected frictional force at the downhole location, where the expected well operation is a tripping-out operation. In some embodiments, a stiff string or a classic soft string model is used to determine the location of the conveyance at which the well operation changes (e.g., from a tripping-out operation to an off-bottom operation).

In some embodiments, the system also generates one or more engineering models of the well operation and diagnoses the issue based on the results of one or more engineering models. Examples of engineering models used include, but are not limited to, a stiff string model of the conveyance deployed during the well operation, a model of one or more wellbore doglegs of the wellbore, a wellbore clearance model, a hole cleaning model, a cuttings pack-off model, as well as other types of models used to simulate one or more aspects of the well operation or the well. In some embodiments, the engineering models are based on one or more of the principles of engineering mechanics, dynamics, fluid mechanics and geo-mechanics.

The system predicts an impact on the well operation due to the issue, such as, but not limited to, a stuck pipe during the well operation, a near-stuck pipe during the well operation, a pack-off having a threshold greater than a pack-off threshold, a loss of circulation that is greater than a circulation threshold, a conveyance deployed in the well operation having a torque that is greater than a threshold torque, a conveyance used during the well operation having a drag response that is greater than a threshold drag response, a cutting bed having a height that is greater than a height threshold, as well as other issues that impact drilling, completion of the well, or hydrocarbon production from the well. In some embodiments, the impact also includes potential and actual damage to the well, delay to the well operation, monetary loss, environmental impact, as well as other adverse effects due to a failure to resolve the issue. The system also determines the likelihood of the occurrence of an impact. In some embodiments, the likelihood of occurrence of the impact is based on one or more parameters, such as, but not limited to, the type of lubricity used for the well operation, presence of the cuttings bed in the wellbore, presence of the pack-off, the dogleg in the wellbore, the keyseat in the wellbore, the degree of curvature of the wellbore, the wellbore tortuosity of the wellbore, the viscous effect of the wellbore, the diameter of the wellbore, the asperity between the conveyance used in the well operation and the wellbore, as well as other parameters related to the well operation or the well. In one or more embodiments, the system runs an uncertainty model, such as the Monte Carlo model for a threshold number of iterations to determine the likelihood of the occurrence of the issue. In some embodiments, certain input parameters to an uncertainty model such as weight on bit, hook load, bit rotation, and torque may further depend on the other calculated values such as dogleg, torsion, torque, hook load and friction factors, which also affect the prediction of the pack-off, stuck pipe and other dysfunctions. Additional descriptions of uncertainty models are provided in the paragraphs below.

The system then determines a solution to overcome the issue. Examples of a solution include, but are not limited to, adjusting the steering of the drill, adjusting the amount or material properties of mud pumped into the well, adjusting the amount or material properties of fluids pumped into the well, as well as adjusting other parameters of the well operation. In some embodiments, the solution is based on an optimization of various operating parameters so that rate of penetration can be maximized (or increased to at least a threshold rate) or cost or mechanical specific energy can be minimized (or decreased to a threshold value). In some embodiments, the solution also provides and defines limits of the operating parameters, which when used, provide the cost savings in avoiding potential problems. In one or more of such embodiments, the system determines a solution to overcome the issue based on the likelihood of occurrence of the issue. In some embodiments, the processes to predict the impact on the well operation, determine the likelihood of occurrence of the impact, and determine one or more solutions to overcome the issue are performed by a neural network component of the system or a neural network assessable by the system.

In some embodiments, the solution is provided to an electronic device of an operator that is operable to make one or more adjustments to the well operation to overcome the issue. In one or more of such embodiments, the likelihood of occurrence, the broomstick chart of the well operation, as well as other parameters of the well operation are also provided to the operator. In some embodiments, the solution is provided to an electronic device that is operable to make dynamic adjustments to the one or more parameters of the well operation to automatically resolve an issue without support from an operator. In one or more of such embodiments, the electronic device dynamically adjusts the one or more parameters in response to determining that the likelihood of occurrence is greater than a threshold rate (e.g., 10%, 50%, 90%, or another rate). In one or more embodiments, the electronic device proposes adjustments to an operator and makes the adjustments after the operator approves such adjustments. In one or more embodiments, the electronic device proposes adjustments to the operator and adjusts one or more parameters of the well operation if the operator does not reject the proposed adjustments within a threshold period of time. In one or more embodiments, any dynamic adjustments made by the electronic device may be manually changed by the operator. Additional descriptions of the foregoing systems and methods to analyze a broomstick chart of a well operation are described in the paragraphs below and are illustrated in FIGS. 1-4.

Figure 1:
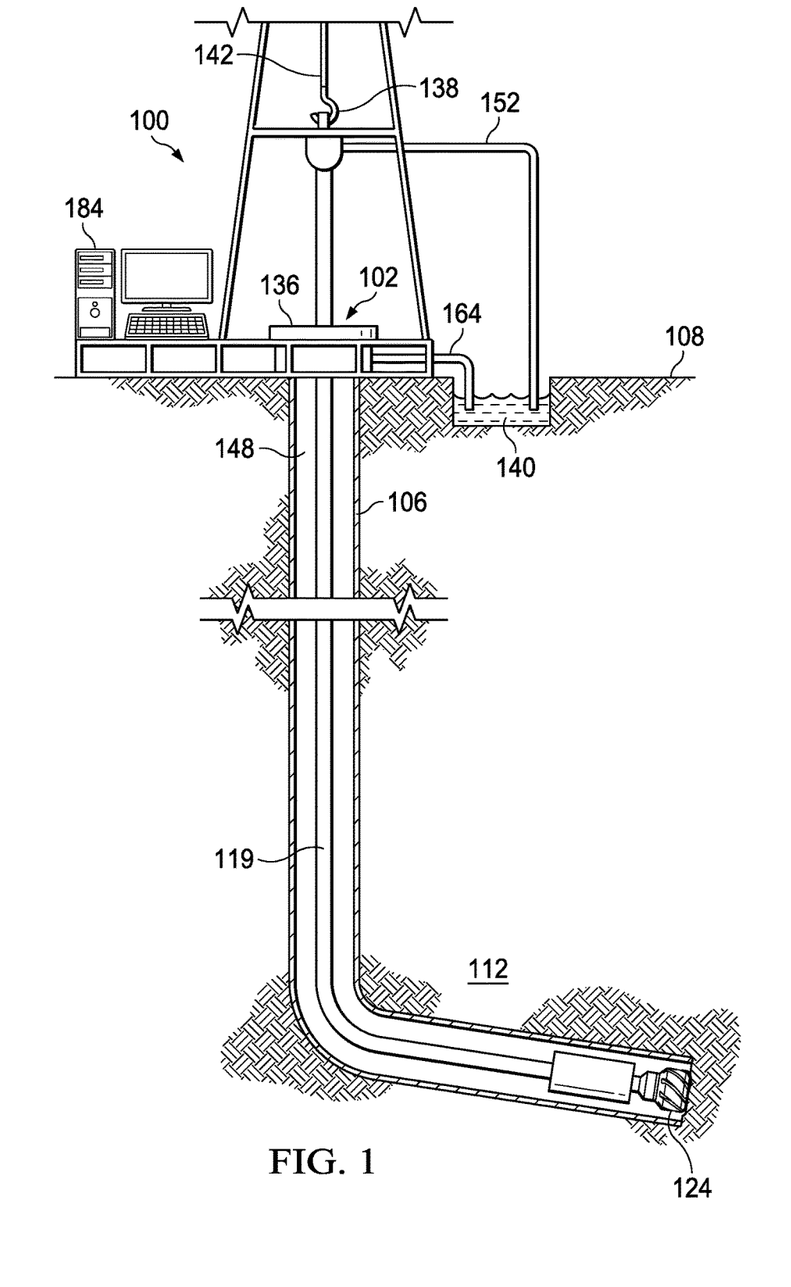
FIG. 1 is a schematic, side view of a drilling environment in which a well operation evaluation system is deployed.

Turning now to the figures, FIG. 1 is a schematic, side view of a drilling environment 100, in which a well operation evaluation system 184 is deployed. In the embodiment of FIG. 1, a well 102 having a wellbore 106 extends from a surface 108 of well 102 to or through a formation 112. A hook 138, cable 142, traveling block (not shown), and hoist (not shown) are provided to lower a conveyance 119 down wellbore 106 of well 102 or to lift conveyance 119 up from wellbore 106 of well 102. In one or more embodiments, conveyance 119 may be a drill string, drill pipe, wireline, slickline, coiled tubing, production tubing, downhole tractor or another type of conveyance operable to be deployed in wellbore 106. At a wellhead 136, an inlet conduit 152 is coupled to a fluid source (not shown) to provide fluids, such as drilling fluids, downhole. In the embodiment of FIG. 1, conveyance 119 has an internal cavity that provides a fluid flow path from surface 108 to a downhole location.

In some embodiments, the fluids travel down conveyance 119 and exit conveyance 119 at a drill bit 124. The fluids flow back toward surface 108 through a wellbore annulus 148 and exit the wellbore annulus 148 via an outlet conduit 164 where the fluids are captured in container 140. In some embodiments, conveyance 119 also provides telemetry of data indicative of one or more parameters of the well operation or the well 102. Examples of parameters of the well operation or well 102 include, but are not limited to, a frictional force experienced by conveyances and tools used in the well operation, the diameter of the wellbore 106, the type of lubricity used for the well operation, presence of the cuttings bed in the wellbore 106, presence of the pack-off, the dogleg in the wellbore 106, the keyseat in the wellbore 106, the degree of curvature of the wellbore 106, the wellbore tortuosity of the wellbore 106, the viscous effect of the wellbore 106, the diameter of the wellbore 106, the asperity between the conveyance used in the well operation and the wellbore 106, as well as other parameters related to the well operation or the well 102.

In some embodiments, sensors or transducers (not shown) are located at the lower end of conveyance 119. In one or more embodiments, sensors are built into a cylindrical drill collar that is positioned close to drill bit 124. While drilling is in progress, these sensors continuously or intermittently determine one or more parameters of the well operation or the well 102, and transmit the information to a surface detector by one or more telemetry techniques including, but not limited to mud pulse telemetry, acoustic telemetry, and electromagnetic wave telemetry. In one or more embodiments, where a mud pulse telemetry system is deployed in wellbore 106 to provide telemetry, telemetry information is transmitted by adjusting the timing or frequency of viable pressure pulses in the drilling fluid that is circulated through conveyance 119 during drilling operations. In one or more embodiments, an acoustic telemetry system that transmits data via vibrations in the tubing wall of conveyance 119 is deployed in wellbore 106 to provide telemetry. More particularly, the vibrations are generated by an acoustic transmitter (not shown) mounted on conveyance 119 and propagate along conveyance 119 to an acoustic receiver (not shown) also mounted on conveyance 119. In one or more embodiments, an electromagnetic wave telemetry system that transmits data using current flows induced in conveyance 119 is deployed in wellbore 106 to provide telemetry. Additional types of telemetry systems may also be deployed in wellbore 106 to transmit data from tools (not shown) and other downhole components to well operation evaluation system 184.

In some embodiments, a surface-based electronic device, such as well operation evaluation system 184, includes one or more processors operable to receive data indicative of a broomstick chart of a well operation. In such embodiments, data obtained prior to and during the well operation are transmitted to well operation evaluation system 184 and are processed by the processors of the well operation evaluation system 184. The processors are further operable to cause well operation evaluation system 184 to perform operations described herein to diagnose an issue during the well operation based on the broomstick chart, predict an impact on the well operation as a result of the issue, determine a likelihood of occurrence of the issue, and determine a solution to overcome the issue. In some embodiments, well operation evaluation system 184 represents an electronic device of an operator working on the well operation or working at well 102. In one or more of such embodiments, well operation evaluation system 184 provides the issue and impact (e.g., continued drilling for another 100 feet will result in conveyance 119 being stuck), likelihood of occurrence (e.g., approximately 30%, between 25%-75% or another value or range of values), and a proposed solution to overcome the issue (e.g., altering the steering of drill bit 124 to avoid conveyance 119 being stuck) to the operator. In one or more of such embodiments, the operator interacts with well operation evaluation system 184 to adjust one or more parameters of the well operation (e.g., adjusting the steering of drill bit 124) to avoid the issue. In some embodiments, well operation evaluation system 184 is operable to dynamically perform one or more adjustments (e.g., altering the steering of drill bit 124) to overcome the diagnosed issue associated with the drilling operation. In one or more of such embodiments, well operation evaluation system 184 performs one or more adjustments if the operator does not authorize a response within a threshold period of time. Additional descriptions of the processors and operations performed by the processors are described in the paragraphs below. Although FIG. 1 illustrates well operation evaluation system 184 as a surface-based electronic device, in some embodiments, well operation evaluation system 184 is located downhole or is located in another surface-based location remote from well 102. In some embodiments, well operation evaluation system 184 also includes drill bit 124, tools (not shown) deployed downhole during the well operation, as well as sensors (not shown) operable to measure one or more parameters of the well operation or the well 102. Although FIG. 1 illustrates a drilling environment, well operation evaluation system 184 may also be deployed in logging while drilling, measurement while drilling, and pre-drilling operations, during which conveyance 119 is tripped into or tripped out of wellbore 106.

Figure 2:
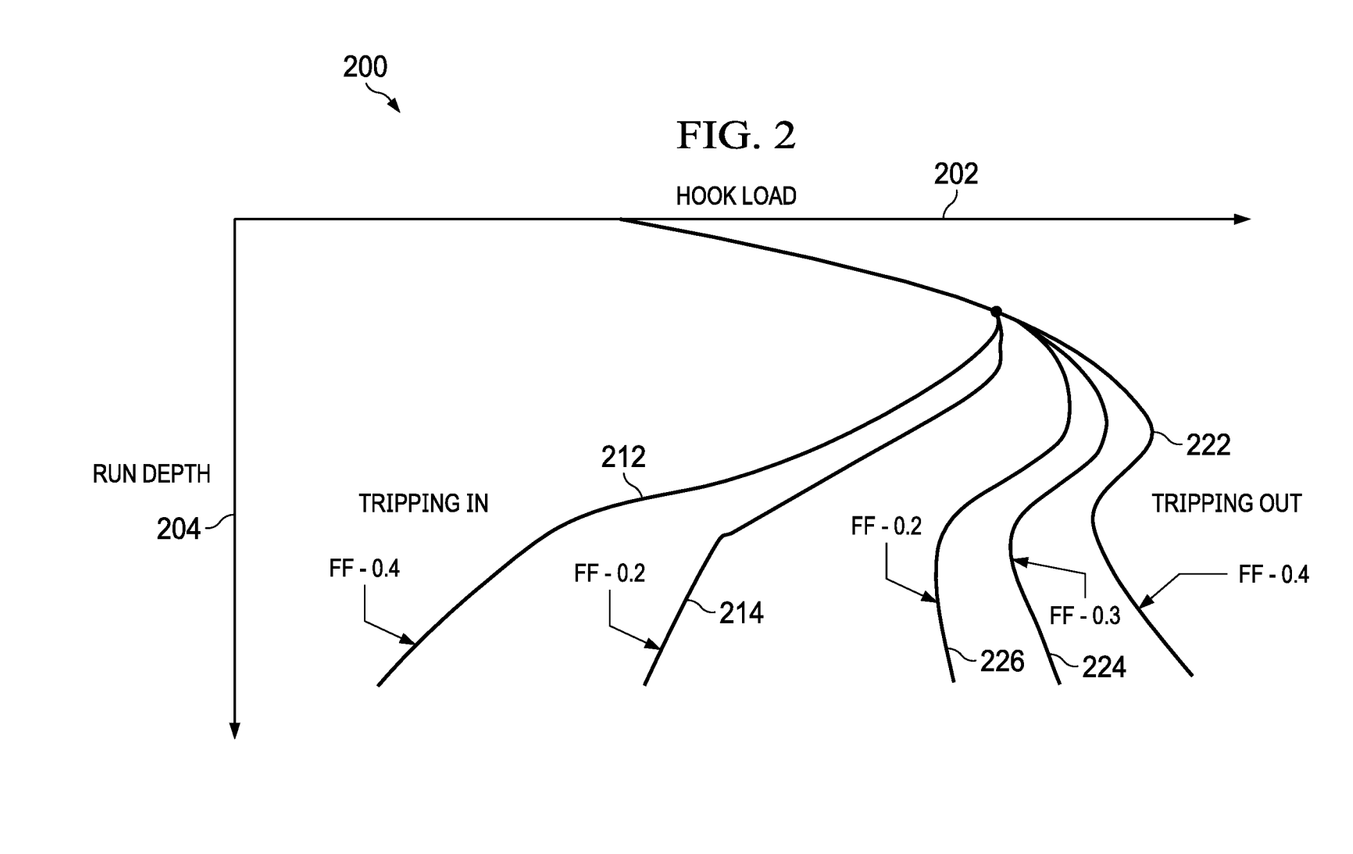
FIG. 2 is a broomstick chart illustrating the effect of frictional force on hook load at different run depth.

FIG. 2 is a broomstick chart 200 illustrating the effect of frictional force on hook load at different run depths. Axis 202 represents hook load of a conveyance, such as conveyance 119 of FIG. 1 as it is tripped in or tripped out of wellbore 106 of FIG. 1, and axis 204 represents the run depth of wellbore 106. Line 212 illustrates the hook load of conveyance 119 at varying run depth during a tripping-in operation if the frictional force is −0.4 and line 214 represents the hook load of conveyance 119 at different run depth during tripping-in of conveyance 119 if the frictional force is −0.2. Further, line 222 represents the hook load of conveyance 119 at different depths during a tripping-out operation if the frictional force is −0.4, line 224 represents the hook load of conveyance 119 at different depths during a tripping-out operation if the frictional force is −0.3, and line 226 represents the hook load of conveyance 119 at different depths during a tripping-out operation if the frictional force is −0.2. In some embodiments, potential problems such as pack-off, stuck pipe, and tool failure are predicted using methods like trend analysis of trends indicated by broomstick charts, such as broomstick chart 200 and pattern match patterns shown on broomstick chart 200 with trends indicated by broomstick charts of other wells supported with engineering analysis. In some embodiments, one or more additional calculations such as friction factor, mechanical specific energy, dogleg, wellbore torsion, wellbore energy, drag, torque, trend, and pattern are cross-correlated for issue prediction. In some embodiments, broomstick charts are analyzed to find a solution to avoid the issue. Further, although FIG. 2 illustrates effects of frictional force on the hook load of a conveyance 119, the broomstick chart illustrated in FIG. 2 may also represent torque, drag, or the effects of other forces on the hook load of the conveyance 119 during other types of operations including, but not limited to rotation on bottom, rotation off-bottom, sliding, backreaming, as well as other well operations performed prior to or during drilling.

Figure 3:
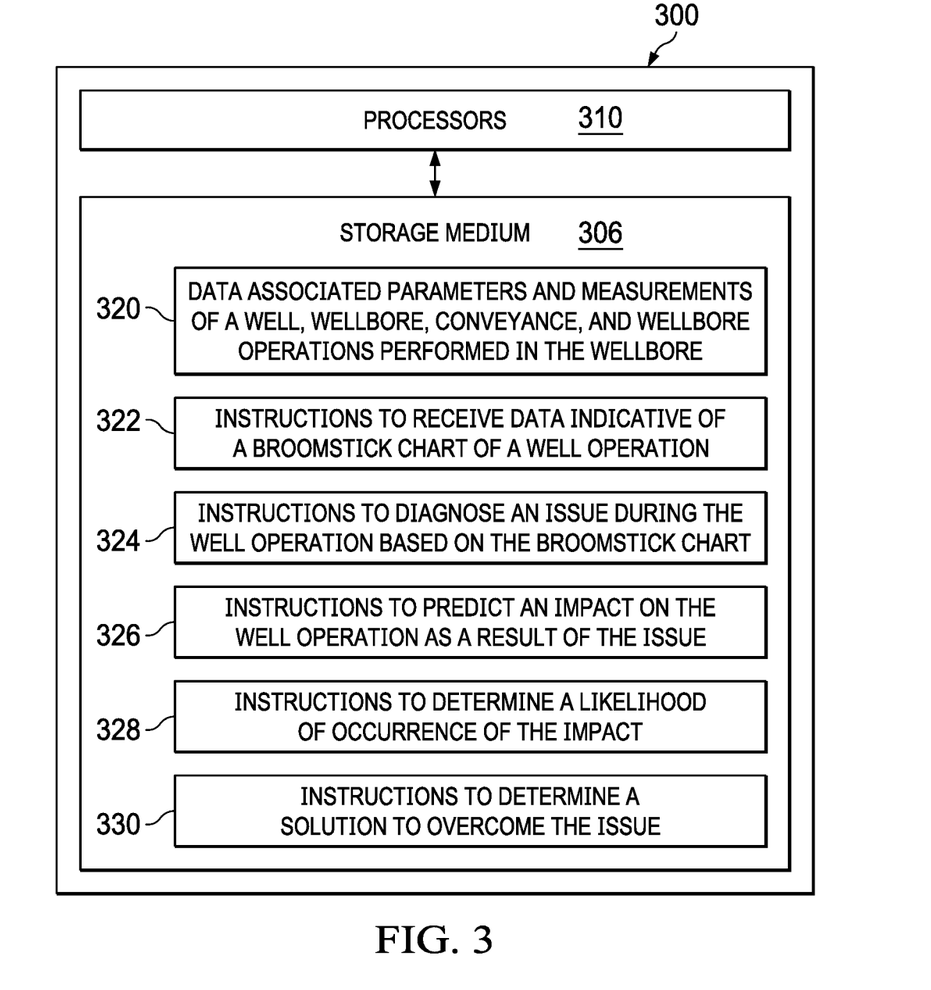
FIG. 3 is a block diagram of a well operation evaluation system.

FIG. 3 is a block diagram of a well operation evaluation system 300 that is deployable in the drilling environment of FIG. 1, or another predrilling or drilling environment. Well operation evaluation system 300 includes a storage medium 306 and processors 310. Storage medium 306 may be formed from data storage components such as, but not limited to, read-only memory (ROM), random access memory (RAM), flash memory, magnetic hard drives, solid-state hard drives, CD-ROM drives, DVD drives, floppy disk drives, as well as other types of data storage components and devices. In some embodiments, storage medium 306 includes multiple data storage devices. In further embodiments, the multiple data storage devices may be physically stored at different locations. Data indicative of parameters and measurements of a well, wellbore, and conveyance, such as well 102, wellbore 106, and conveyance 119 of FIG. 1, as well as parameters and measurements of well operations performed in wellbore 106 are transmitted to well operation evaluation system 300 and are stored at a first location 320 of storage medium 306. As shown in FIG. 3, instructions to receive data indicative of a broomstick chart of a well operation are stored at a second location 322 of storage medium 306, instructions to diagnose an issue during the well operation based on the broomstick chart are stored at a third location 324 of the storage medium 306, instructions to predict an impact on the well operation as a result of the issue are stored at a fourth location 326 of storage medium 306, instructions to determine a likelihood of occurrence of the impact are stored at a fifth location 328 of storage medium 306, and instructions to determine a solution to overcome the issue are stored at a sixth location 330 of storage medium 306. The instructions to perform other operations described herein are also stored in the storage medium 306.

In some embodiments, well operation evaluation system 300 is a component of well operation evaluation system 184 of FIG. 1, or a component of another surface-based electronic device. In some embodiments, well operation evaluation system 300 is formed from well operation evaluation system 184 of FIG. 1, or from other surface-based electronic devices. In further embodiments, well operation evaluation system 300 is a component of a downhole tool that is deployed in wellbore 106 of FIG. 1. In further embodiments, parts of well operation evaluation system 300 are deployed on a surface-based electronic device, such as well operation evaluation system 184 of FIG. 1, and parts of well operation evaluation system 300 are deployed downhole.

In some embodiments, well operation evaluation system 300 contains additional components used to evaluate various well operations. For example, in some embodiments, well operation evaluation system 300 also includes drill bit 124 of FIG. 1 as well as other downhole tools or sensors used to obtain data associated with parameters and measurements of well 102, wellbore 106, conveyance 119 and well operations performed in wellbore 106 of FIG. 1. In other embodiments, well operation evaluation system 300 also includes telemetry systems described in FIG. 1, or other telemetry systems operable to transmit data between downhole tools and sensors and well operation evaluation system 184 of FIG. 1. In one or more of such embodiments, well operation evaluation system 300 also includes transmitters, receivers, transceivers, as well as other components used to transmit data between downhole tools and well operation evaluation system 184 of FIG. 1.

Figure 4:
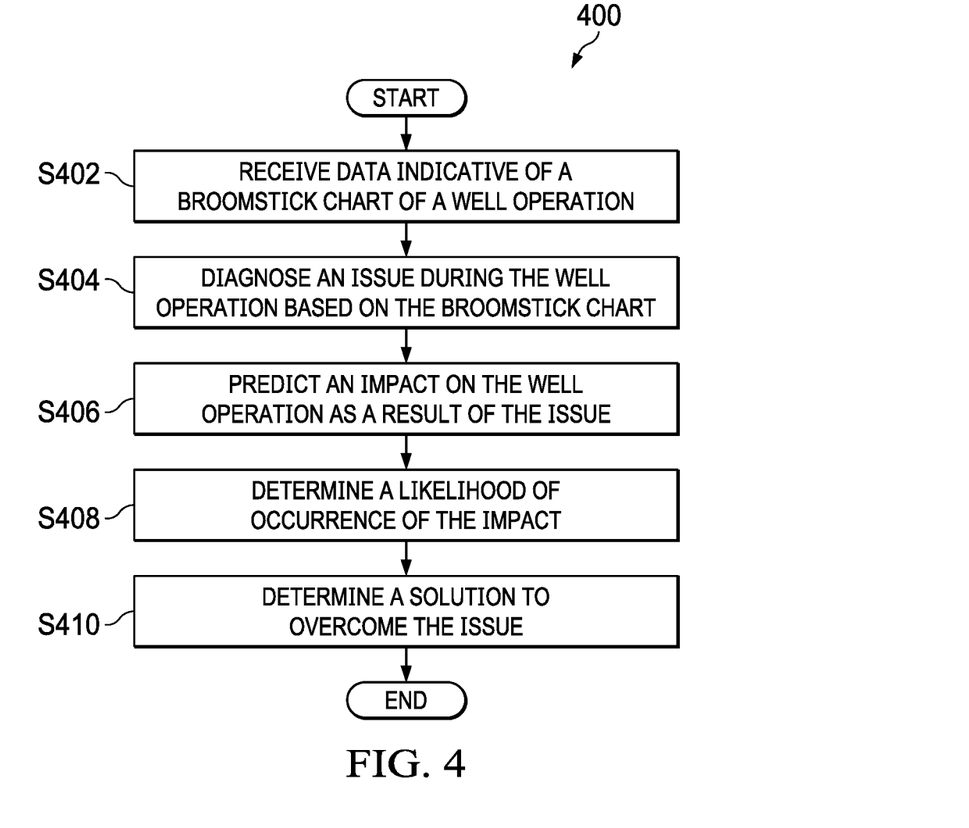
FIG. 4 is a flow chart of a process to analyze a broomstick chart of a well operation.

FIG. 4 is a flow chart of a process 400 to analyze a broomstick chart of a well operation. Although the operations in the process 400 are shown in a particular sequence, certain operations may be performed in different sequences or at the same time where feasible. Further, although the operations in process 400 are described to be performed by processors 310 of well operation evaluation system 300 of FIG. 3, the operations may also be performed by one or more processors of other electronic devices operable to perform operations described herein.

As described below, process 400 provides an intuitive way for evaluating well operations and analyzing broomstick charts of well operations, such as well operations described herein and performed in the environment of FIG. 1. The process provides real time or near real time analysis of various issues associated with continuing an ongoing well operation, the likelihood of occurrence of the respective issues, as well as solutions to avoid the respective issues, thereby allowing an operator to make informed real time or near real time decisions to analyze the respective issues and make changes to avoid the respective issues. The foregoing allows the operator to make informed real-time adjustments to correct human and machine errors, thereby reducing the financial costs as well as safety hazards attributed to such errors.

Processors of a well operation evaluation system, such as processors 310 of FIG. 3, receive at block S402, data indicative of a broomstick chart of a well operation. The processors, at block S404, diagnose an issue during the well operation based on the broomstick chart. Examples of issues include, but are not limited to, a stuck pipe during the well operation, a near-stuck pipe during the well operation, a pack-off having a threshold greater than a pack-off threshold, a loss of circulation that is greater than a circulation threshold, a conveyance deployed during the well operation having a torque that is greater than a threshold torque, a conveyance used during the well operation having a drag response that is greater than a threshold drag response, a cutting bed having a height that is greater than a height threshold, as well as other issues that impact drilling, completion of the well, or hydrocarbon production from the well. Further, in some embodiments, issues also include potential issues that may occur as a result of performing the well operation at the current set of parameters. For example, processors 310 of FIG. 3 would determine that there is an issue associated with a well operation if performing the well operation at the current parameters would result in a stuck pipe if the operation continues for another 50 feet, 100 feet, 200 feet, or another distance. In some embodiments, the processors, such as processors 310 of FIG. 3, determine expected values and actual values of one or more parameters of the well operation and diagnose the issue based on the differences between the expected values and actual values of the one or more parameters. For example, processors 310, in response to determining the expected value of frictional force is −0.2 and the actual value of the frictional force is −0.4, or differs from the expected value by a threshold amount or ratio, also determine that there is an issue with the well operation.

In some embodiments, the processors, such as processors 310 of FIG. 3, also generate one or more engineering models of the well operation and diagnose the issue based on the results of one or more engineering models. Examples of engineering models used include, but are not limited to, a model (e.g., stiff string model, soft string model, hybrid model, dynamic toque and drag model, or other model of the conveyance) of the conveyance deployed during the well operation, a model of one or more wellbore doglegs of the wellbore, a wellbore clearance model, a hole cleaning model, a cuttings pack-off model, as well as other types of models used to simulate one or more aspects of the well operation or the well. In some embodiments, processors 310 generate a model of the conveyance, such as conveyance 119 of FIG. 1 to obtain a tolerable tortuosity value or range of a wellbore, such as wellbore 106 of FIG. 1. In one or more of such embodiments, drilling a wellbore with doglegs higher than the tolerable tortuosity would incur additional side forces, whereas drilling a wellbore with doglegs below the tolerable tortuosity would cause the conveyance to generate insufficient side force. In such embodiments, processors 310 compare the measured tortuosity with the tolerable tortuosity generated by running a model of the conveyance (e.g., a stiff string model, a soft string model, a hybrid model, a dynamic torque and drag model, or another model of the conveyance) and determine whether the measured tortuosity would be an issue, and whether the current parameters of the well operation should be adjusted to resolve this issue. In some embodiments, processors 310 generate a wellbore clearance model to determine the onset of sinusoidal buckling, and to cross correlate the sinusoidal buckling against derivation in drag and torque values to quantify the wellbore quality. In one or more of such embodiments, processors 310 then determine whether the current parameters of the well operation should be changed, and if so, how to change the current parameters to improve the wellbore quality.

At block S406, the processors, such as processors 310 of FIG. 3, predict an impact on the well operation as a result of the issue. Examples of impacts include, but are not limited to, a stuck pipe during the well operation, a near-stuck pipe during the well operation, a pack-off having a threshold greater than a pack-off threshold, a loss of circulation that is greater than a circulation threshold, a conveyance deployed during the well operation having a torque that is greater than a threshold torque, a conveyance used during the well operation having a drag response that is greater than a threshold drag response, a cutting bed having a height that is greater than a height threshold, as well as other issues that impact drilling, completion of the well, or hydrocarbon production from the well. In some embodiments, the impact also includes potential and actual damage to the well, delay to the well operation, monetary loss, environmental impact, as well as other adverse effects due to a failure to resolve the issue.

At block S408, the processors, such as processors 310 of FIG. 3, determine the likelihood of the occurrence of an impact. In some embodiments, the likelihood of occurrence of the impact is based on one or more parameters, such as, but not limited to, the type of lubricity used for the well operation, presence of the cuttings bed in the wellbore, presence of the pack-off, the dogleg in the wellbore, the keyseat in the wellbore, the degree of curvature of the wellbore, the wellbore tortuosity of the wellbore, the viscous effect of the wellbore, the diameter of the wellbore, the asperity between the conveyance used in the well operation and the wellbore, as well as other parameters related to the well operation or the well. In one or more embodiments, the processors run an uncertainty model, such as the Monte Carlo model for a threshold number of iterations (e.g., 100 iterations, 1,000 iterations, 10,000 iterations, or a different number of iterations) to determine the likelihood of the occurrence of the issue. In one or more of such embodiments, the processors select one or more probability levels of a probability analysis of likelihood of the occurrence of one or more parameters based on an uncertainty model after the uncertainty model is run for the threshold number of iterations. For example, where one of the parameters is the presence of cuttings bed in the wellbore, three probability levels (or a different number of probability levels) indicative of 10% likelihood, 50% likelihood, and 90% likelihood are selected and the processors determine whether the probability of the presence of cuttings bed in the wellbore reaches one or more of the probability levels. In one or more embodiments, a threshold number (e.g., 10, 100, 1,000, or another number) of iterations of an uncertainty model is generated, and the likelihood of occurrence is based on a distribution of the threshold number of iterations of the uncertainty model.

At block S410, the processors determine a solution to overcome the issue. Examples of a solution include, but are not limited to, adjusting the steering of the drill, adjusting the amount or material properties of mud pumped into the well, adjusting the amount or material properties of fluids pumped into the well, as well as adjusting other parameters of the well operation. In one or more of such embodiments, the system determines a solution to overcome the issue based on the likelihood of occurrence of the issue. In some embodiments, the processes to predict the impact on the well operation, determine the likelihood of occurrence of the impact, and determine a solution to overcome the issue are performed by a neural network component of a system, such as well operation evaluation system 300 of FIG. 3, or a neural network assessable by the system. In some embodiments, the solution is provided to an electronic device of an operator that is operable to make one or more adjustments to the well operation to overcome the issue. In one or more of such embodiments, the likelihood of occurrence, the broomstick chart of the well operation, as well as other parameters of the well operation are also provided to the operator. In some embodiments, the processors provide the solution to an electronic device that is operable to make dynamic adjustments to the one or more parameters of the well operation to automatically resolve an issue without support from an operator. In one or more of such embodiments, the processors dynamically adjust the one or more parameters in response to determining that the likelihood of occurrence is greater than a threshold rate (e.g., 10%, 50%, 90%, or another rate). In one or more embodiments, the processors propose adjustments to an operator and make the adjustments after the operator approves such adjustments. In one or more embodiments, the processors propose adjustments to the operator and adjust one or more parameters of the well operation if the operator does not reject the proposed adjustments within a threshold period of time.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, a computer-implemented method to analyze a broomstick chart of a well operation, the method comprising receiving data indicative of a broomstick chart of a well operation; diagnosing an issue during the well operation based on the broomstick chart; predicting an impact on the well operation as a result of the issue; determining a likelihood of occurrence of the impact; and determining a solution to overcome the issue.

Clause 2, the computer-implemented method of clause 1, further comprising providing the solution to an electronic device of an operator operable to make one or more adjustments to the well operation to overcome the issue.

Clause 3, the computer-implemented method of clauses 1 or 2, further comprising providing the solution to an electronic device operable to dynamically make one or more adjustments to the well operation to overcome the issue.

Clause 4, the computer-implemented method of clause 1, further comprising dynamically performing one or more adjustments to the well operation in response to determining the solution to overcome the issue.

Clause 5, the computer-implemented method of claim 4, wherein dynamically performing the one or more adjustments comprises dynamically performing the one or more adjustments in response to determining that the likelihood of occurrence is greater than a threshold.

Clause 6, the computer-implemented method of any of clauses 1-5, wherein determining the solution comprises determining the solution based on the issue and the likelihood of the occurrence of the issue.

Clause 7, the computer-implemented method of any of clauses 1-6, wherein diagnosing the issue of the operation, predicting the impact on the well operation, determining the likelihood of occurrence of the impact, and determining the solution to overcome the issue are performed by a neural network.

Clause 8, the computer-implemented method of any of clauses 1-7, further comprising determining an expected value of a parameter of the well operation; and determining an actual value of the parameter of the well operation, wherein diagnosing the issue during the well operation is based on a difference between the excepted value of the parameter and the actual value of the parameter.

Clause 9, the computer-implemented method of clause 8, wherein the parameter of the well operation is a frictional force associated with the well operation.

Clause 10, the computer-implemented method of any of clauses 1-9, wherein the well operation comprises one of a rotating-off-bottom operation, a rotating-on-bottom operation, a tripping-in operation, a tripping-out operation, a sliding operation, and a backreaming operation.

Clause 11, the computer-implemented method of any of clauses 1-10, further comprising determining one or more of a type of mud used for the well operation, a type of lubricity used for the well operation, presence of a cuttings bed in a wellbore associated with the well operation, presence of a pack-off, a dogleg in the wellbore, a keyseat in the wellbore, a degree of curvature of the wellbore, a wellbore tortuosity of the wellbore, a viscous effect of the wellbore, a diameter of the wellbore, and an asperity between a conveyance used in the well operation and the wellbore, wherein determining the likelihood of occurrence of the impact comprises determining the likelihood of occurrence of the impact based on at least one of the type of lubricity used for the well operation, presence of the cuttings bed in the wellbore, presence of the pack-off, the dogleg in the wellbore, the keyseat in the wellbore, the degree of curvature of the wellbore, the wellbore tortuosity of the wellbore, the viscous effect of the wellbore, the diameter of the wellbore, and the asperity between the conveyance used in the well operation and the wellbore.

Clause 12, the computer-implemented method of any of clauses 1-11, wherein the issue during the well operation comprises at least one of a stuck pipe during the well operation, a near-stuck pipe during the well operation, a pack-off having a threshold greater than a pack-off threshold, a loss of circulation that is greater than a circulation threshold, a conveyance deployed during the well operation having a torque that is greater than a threshold torque, a conveyance used during the well operation having a drag response that is greater than a threshold drag response, and a cutting bed having a height that is greater than a height threshold.

Clause 13, the computer-implemented method of any of clauses 1-12, further comprising generating a threshold number of iterations of an uncertainty model of the well operation, wherein the likelihood of occurrence of the impact is based on a distribution of the threshold number of iterations of the uncertainty model.

Clause 14, the computer-implemented method of any of clauses 1-13, further comprising generating one or more engineering models of the well operation, wherein diagnosing the issue comprises diagnosing the issue based on results of the one or more engineering models.

Clause 15, the computer-implemented method of claim 14, wherein the one or more engineering models comprise a stiff string model of a conveyance deployed during the well operation, a model of one or more wellbore doglegs of a wellbore associated with the well operation, and a wellbore clearance model, a hole cleaning model, and a cuttings pack-off model.

Clause 16, a well operation evaluation system, the system comprising a storage system; and one or more processors operable to receive data indicative of a broomstick chart of a well operation; diagnose an issue during the well operation based on the broomstick chart; predict an impact on the well operation as a result of the issue; determine a likelihood of occurrence of the impact; and determine a solution to overcome the issue; and provide the solution to overcome the issue.

Clause 17, the well operation evaluation system of clause 16, wherein the well operation comprises one of a rotating-off-bottom operation, a rotating-on-bottom operation, a tripping-in operation, a tripping-out operation, a sliding operation, and a backreaming operation.

Clause 18, the well operation evaluation system of clauses 16 or 17, wherein the one or more processors are operable to dynamically perform one or more adjustments to the well operation in response to a determination of the solution to overcome the issue.

Clause 19, a non-transitory machine-readable medium comprising instructions stored therein, which when executed by one or more processors, cause the one or more processors to perform operations comprising receiving data indicative of a broomstick chart of a well operation; diagnosing an issue during the well operation based on the broomstick chart; predicting an impact on the well operation as a result of the issue; determining a likelihood of occurrence of the impact; determining a solution to overcome the issue; and providing the solution to overcome the issue.

Clause 20, the non-transitory machine-readable medium of clause 19, wherein the instructions when executed by one or more processors, cause the one or more processors to perform operations comprising determining an expected value of a parameter of the well operation; and determining an actual value of the parameter of the well operation, wherein diagnosing the issue during the well operation is based on a difference between the excepted value of the parameter and the actual value of the parameter.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A computer-implemented method to analyze a broomstick chart of a well operation, the method comprising:
deploying a conveyance in a wellbore during a performance of a well operation;
receiving, via the conveyance, telemetry indicative of one or more parameters of the well operation;
receiving data indicative of a broomstick chart of the well operation;
diagnosing an issue during the well operation based on the broomstick chart;
predicting an impact on the well operation as a result of the issue;
determining, based on the predicted impact, a solution to overcome the issue, the solution comprising adjustments to the at least one of the one or more parameters of the well operation;
causing an electronic device to dynamically adjust, based on the solution, the at least one of the one or more parameters of the well operation after a threshold period of time is exceeded without a response from an operator; and
performing the well operation using the dynamically adjusted parameters.

2. The computer-implemented method of claim 1, further comprising providing the solution to the electronic device.

3. The computer-implemented method of claim 1, wherein dynamically adjusting the at least one of the one or more parameters comprises dynamically adjusting the at least one of the one or more parameters in response to determining that a likelihood of occurrence of the predicted impact is greater than a threshold.

4. The computer-implemented method of claim 1, wherein determining the solution comprises determining the solution based on the issue and a likelihood of the occurrence of the issue.

5. The computer-implemented method of claim 1, wherein diagnosing the issue of the well operation, predicting the impact on the well operation, and determining the solution to overcome the issue are performed by a neural network.

6. The computer-implemented method of claim 1, further comprising:
determining an expected value of one of the parameters of the well operation; and
determining an actual value of the one of the parameters of the well operation,
wherein diagnosing the issue during the well operation is based on a difference between the expected value of the one of the parameters and the actual value of the one of the parameters.

7. The computer-implemented method of claim 6, wherein the one of the parameters of the well operation is a frictional force associated with the well operation.

8. The computer-implemented method of claim 1, wherein the well operation comprises one of a rotating-off-bottom operation, a rotating-on-bottom operation, a tripping-in operation, a tripping-out operation, a sliding operation, and a backreaming operation.

9. The computer-implemented method of claim 1, further comprising determining one or more of a type of mud used for the well operation, a type of lubricity used for the well operation, presence of a cuttings bed in a wellbore associated with the well operation, presence of a pack-off, a dogleg in the wellbore, a keyseat in the wellbore, a degree of curvature of the wellbore, a wellbore tortuosity of the wellbore, a viscous effect of the wellbore, a diameter of the wellbore, and an asperity between the conveyance and the wellbore, wherein predicting the impact comprises determining a likelihood of occurrence of the impact based on at least one of the type of lubricity used for the well operation, presence of the cuttings bed in the wellbore, presence of the pack-off, the dogleg in the wellbore, the keyseat in the wellbore, the degree of curvature of the wellbore, the wellbore tortuosity of the wellbore, the viscous effect of the wellbore, the diameter of the wellbore, and the asperity between the conveyance and the wellbore.

10. The computer-implemented method of claim 1, wherein the issue during the well operation comprises at least one of a stuck pipe during the well operation, a near-stuck pipe during the well operation, a pack-off having a threshold greater than a pack-off threshold, a loss of circulation that is greater than a circulation threshold, a conveyance deployed during the well operation having a torque that is greater than a threshold torque, a cutting bed having a height that is greater than a height threshold, and wherein the conveyance has a drag response that is greater than a threshold drag response.

11. The computer-implemented method of claim 1, further comprising generating a threshold number of iterations of an uncertainty model of the well operation, wherein the prediction of the impact is based on a distribution of the threshold number of iterations of the uncertainty model.

12. The computer-implemented method of claim 1, further comprising:
generating one or more engineering models of the well operation, wherein diagnosing the issue comprises diagnosing the issue based on results of the one or more engineering models.

13. The computer-implemented method of claim 12, wherein the one or more engineering models comprise a stiff string model of the conveyance deployed during the well operation, a model of one or more wellbore doglegs of a wellbore associated with the well operation, and a wellbore clearance model, a hole cleaning model, and a cuttings pack-off model.

14. A well operation evaluation system, the system comprising:
a storage system; and
one or more processors are coupled to the storage system and operable to:
deploy a conveyance in a wellbore during a performance of a well operation;
receive, via the conveyance, telemetry indicative of one or more parameters of the well operation;
receive data indicative of a broomstick chart of the well operation;
diagnose an issue during the well operation based on the broomstick chart;
predict an impact on the well operation as a result of the issue;
determine, based on the predicted impact, a solution to overcome the issue, the solution comprising adjustments to the at least one of the one or more parameters of the well operation;
cause an electronic device to dynamically adjust, based on the solution, the at least one of the one or more parameters of the well operation after a threshold period of time is exceeded without a response from an operator; and perform the well operation using the dynamically adjusted parameters.

15. The well operation evaluation system of claim 14, wherein the well operation comprises one of a rotating-off-bottom operation, a rotating-on-bottom operation, a tripping-in operation, a tripping-out operation, a sliding operation, and a backreaming operation.

16. A non-transitory machine-readable medium comprising instructions stored therein, which when executed by one or more processors, cause the one or more processors to perform operations comprising:

deploying a conveyance in a wellbore during a performance of a well operation;

receiving, via the conveyance, telemetry indicative of one or more parameters of the well operation;

receiving data indicative of a broomstick chart of the well operation;

diagnosing an issue during the well operation based on the broomstick chart;

predicting an impact on the well operation as a result of the issue;

determining, based on the predicted impact, a solution to overcome the issue, the solution comprising adjustments to the at least one of the one or more parameters of the well operation;

causing an electronic device to dynamically adjust, based on the solution, the at least one of the one or more parameters of the well operation after a threshold period of time is exceeded without a response from an operator; and performing the well operation using the dynamically adjusted parameters.

17. The non-transitory machine-readable medium of claim 16, wherein the instructions when executed by one or more processors, cause the one or more processors to perform operations comprising:

determining an expected value of one of the parameters of the well operation; and determining an actual value of the one of the parameters of the well operation, wherein diagnosing the issue during the well operation is based on a difference between the expected value of the one of the parameters and the actual value of the one of the parameters.

* * * * *